(12) United States Patent
Klamik (10) Patent No.: US 7,490,269 B2
(45) Date of Patent: Feb. 10, 2009

(54) NOISE ACCOMMODATION IN HARDWARE AND SOFTWARE TESTING

(75) Inventor: Brian T. Klamik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 11/210,995

(22) Filed: Aug. 24, 2005

(65) Prior Publication Data

US 2007/0050677 A1    Mar. 1, 2007

(51) Int. Cl.
*G06F 11/00* (2006.01)

(52) U.S. Cl. .......................... 714/38; 714/47; 717/124; 717/154; 717/158

(58) Field of Classification Search .................. None
See application file for complete search history.

(56) References Cited

U.S. PATENT DOCUMENTS

| | | | | |
|---|---|---|---|---|
| 4,432,051 A * | 2/1984 | Bogaert et al. | ............. | 717/127 |
| 4,845,615 A * | 7/1989 | Blasciak | ............. | 714/10 |
| 5,204,956 A * | 4/1993 | Danuser et al. | ............. | 714/47 |
| 6,467,052 B1 * | 10/2002 | Kaler et al. | ............. | 714/39 |
| 6,874,099 B1 * | 3/2005 | Balasubramanian et al. | ... | 714/4 |
| 7,013,456 B1 * | 3/2006 | Van Dyke et al. | ............. | 717/130 |
| 2002/0124237 A1 * | 9/2002 | Sprunt et al. | ............. | 717/127 |
| 2002/0129339 A1 * | 9/2002 | Callahan et al. | ............. | 717/127 |
| 2002/0147966 A1 * | 10/2002 | Frazier | ............. | 717/127 |
| 2002/0166112 A1 * | 11/2002 | Martin et al. | ............. | 717/124 |
| 2003/0204588 A1 * | 10/2003 | Peebles et al. | ............. | 709/224 |
| 2003/0204789 A1 * | 10/2003 | Peebles et al. | ............. | 714/47 |
| 2004/0194077 A1 * | 9/2004 | Bharadwaj et al. | ............. | 717/158 |
| 2005/0155026 A1 * | 7/2005 | DeWitt et al. | ............. | 717/158 |
| 2006/0064687 A1 * | 3/2006 | Dostert | ............. | 718/1 |
| 2006/0129891 A1 * | 6/2006 | Padisetty et al. | ............. | 714/38 |
| 2006/0129992 A1 * | 6/2006 | Oberholtzer et al. | ............. | 717/124 |
| 2006/0206855 A1 * | 9/2006 | Nair et al. | ............. | 717/100 |
| 2006/0259826 A1 * | 11/2006 | Swoboda et al. | ............. | 714/38 |

\* cited by examiner

*Primary Examiner*—Robert Beausoliel
*Assistant Examiner*—Charles Ehne
(74) *Attorney, Agent, or Firm*—Woodcock Washburn LLP (57) ABSTRACT

In testing hardware and/or software, processor events can be logged during a test. Using the events, we can determine an amount of processor activity not used to execute software considered to be involved in the test. Such noise may then be accounted for in determining and prioritizing regressions, as well as to improve test results generally.

15 Claims, 6 Drawing Sheets

| CSwitch | Time | OldState | Wait Reason | Old TID | Old Process Name (Pid) | New TID | New Process Name (Pid) | ... |
|---|---|---|---|---|---|---|---|---|
| Interrupt | TimeStamp | ElapsedTime | Processor | ServiceRoutine Address | ServiceRoutine | ServiceRetVal | | |
| DPC | TimeStamp | DPC Time | Processor | DpcAddr | Image!Function | | | |
| DPCTmr | TimeStamp | DPC Time | Processor | DpcAddr | Image!Function | | | |
| Mark | Time | Mark | | | | | | |
| | | | | | | | | |
| Mark | 417688 | Begin Test | | | | | | |
| DPCTmr | 418273 | 91 | 0 | 0xAAE8F7FE | tcpip.sys! TcpPeriodicTime outHandler | | | |
| DPCTmr | 418275 | 1 | 0 | 0xAADCFEEA | rdbss.sys! RxTimerDispatch | | | |
| CSwitch | 480529 | Ready | Executive | 4272 | batching.exe (4572) | 4360 | System ( 4) | ... |
| DPCTmr | 480681 | 1 | 0 | 0xAADCFEEA | rdbss.sys! RxTimerDispatch | | | |
| DPCTmr | 480686 | 5 | 0 | 0xF6D53B7E | usbport.sys! USBPORT_DM_Ti merDpc | | | |
| DPCTmr | 480689 | 2 | 0 | 0xF6D53B7E | usbport.sys! USBPORT_DM_Ti merDpc | | | |
| DPCTmr | 480692 | 2 | 0 | 0x8080E7F6 | ntoskrnl.exe! CcWorkerThread | | | |
| CSwitch | 480821 | Waiting | Executive | 4360 | System ( 4) | 28 | System ( 4) | ... |

NOISE ACCOMMODATION IN HARDWARE AND SOFTWARE TESTING

BACKGROUND

One aspect of hardware and software testing involves discovering "regressions" or slow operation of computer hardware or software. In the modern era of automated testing, thousands of tests may be run prior to releasing a product on the market. Regressions discovered in this rigorous testing process should be investigated, which typically requires human investigation into the cause of regressions.

The modern computing system is a complex environment. To simulate real-world conditions, it is desirable to test in this complex environment. For example, a software test may run while various unrelated or tangentially related hardware or software components are initialized on a computing device. Such additional hardware or software components may impact the operation of software under test. In fact, it is desirable to test under a number of different hardware and software configurations to simulate the variety of complex environments under which hardware or software components may function.

In a field where a large number of tests may be run in complex environments, and problems require human investigation, it is important to ensure that identified regressions are in fact caused by the computer hardware or software under test. Time spent investigating regressions that are caused by "noise" or some uninteresting aspect of the complex environment is often time wasted.

In view of the need in the industry to improve efficiency in software testing, there is a need to account for noise in hardware and software testing.

SUMMARY

In consideration of the above-identified difficulties, the present invention provides systems and methods for accounting for noise in hardware and software testing. Processor events can be logged during a test. Using the events, we can determine an amount of processor activity not used to execute software considered to be involved in the test. Such noise may then be accounted for in determining and prioritizing regressions, as well as to improve test results generally. Other advantages and features of the invention are described below.

DRAWINGS

The systems and methods for noise accommodation in hardware and software testing in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods may be described with reference to steps and sequences in the following disclosure, the description as such is for providing a clear implementation of embodiments of the invention, and the steps and sequences of steps should not be taken as required to practice this invention.

Figure 1:
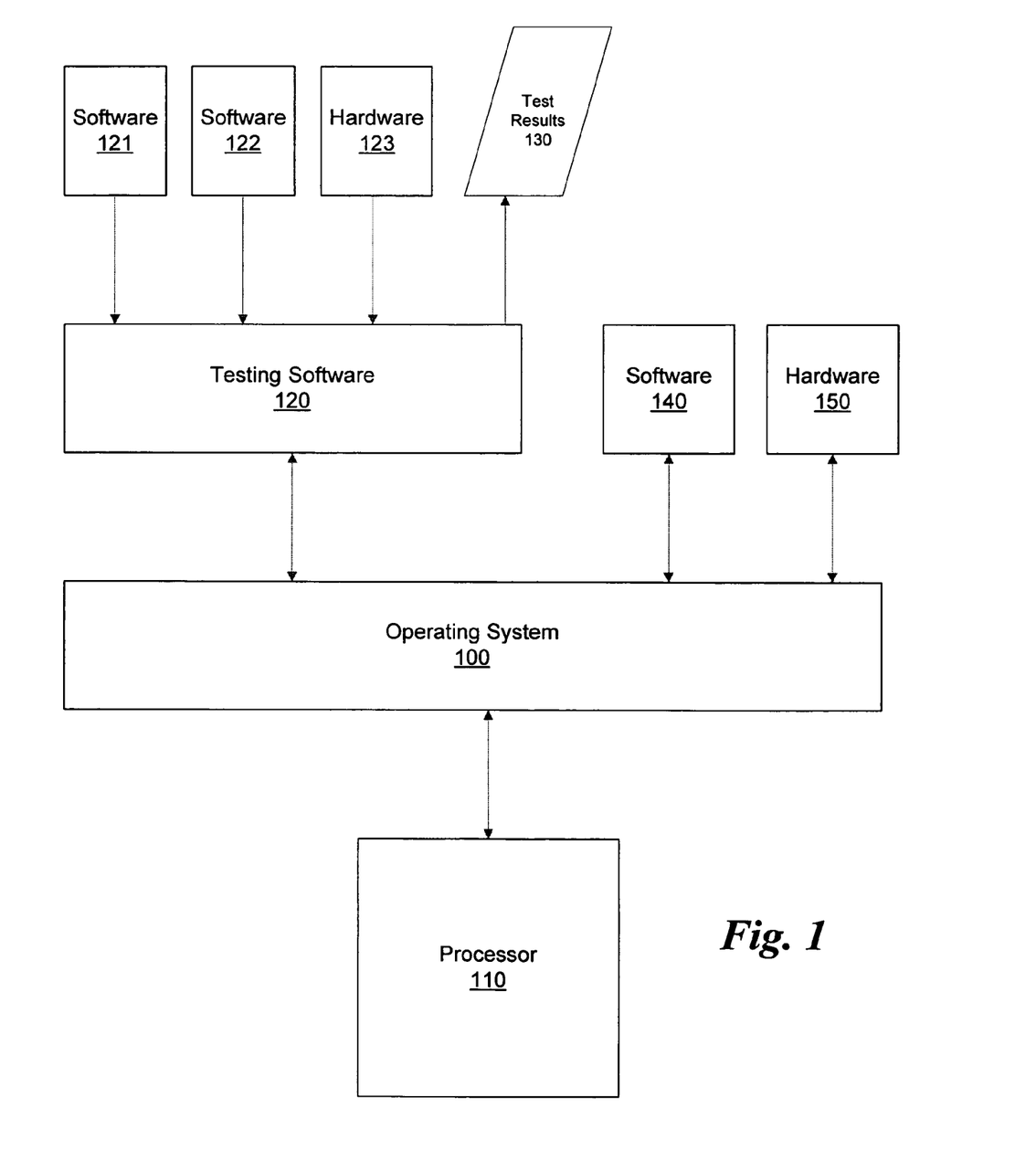
FIG. 1 illustrates a context in which embodiments of the invention may operate, the context comprising a processor 110, an operating system 100, testing software 120 that may produce test results 130, software and hardware under test 121-123, and other software 140 and/or hardware 150 that may draw upon processor 110 resources.

FIG. 1 illustrates a context in which embodiments of the invention may operate. Testing software 120, software 140 and hardware 150 may operate by demanding services from an operating system 100, which allocates system resources, such as processor 110 resources, to execution of the demands. As described above, it is desirable to simulate real world conditions by testing in a variety of environments. This can be done by testing using a variety of different operating systems in the place of 100, a variety of different processor types in the place of 110, and a variety of different other software and hardware configurations in the place of 140 and 150. As might be imagined, there are an enormous number of potential test configurations. Modern software testing can produce a correspondingly enormous number of test results.

In general, computer testing may be carried out by testing software 120. Testing software 120 may test software 121 and 122 which may be, for example, a computer program or a feature of a computer program. Software 121 and 122 may comprise programs designed to run on operating system 100, or in the case of operating system development, may themselves be features or components of operating system 100.

A modern computer program may be embodied in compiled binaries that represent a machine readable version of human readable source code, or may be source code that executes via virtual machine technology and just-in-time compiling as has become popular with the JAVA and .NET technologies. Any software that can execute via some arrangement of supporting hardware and software can also be tested.

Hardware 123 may also be tested by testing software 120. Just as software 121, 122 may be part of operating system 100, hardware 123 may be any hardware operably connected to or integrated into the associated computer system, including processor 110. For example, aspects of the WINDOWS® operating systems are tested by MICROSOFT® Corporation to determine how well they perform on certain hardware configurations and processor types. Complimentary testing may be performed by hardware manufacturers, such as INTEL® Corporation, to determine how well their hardware, e.g. microprocessors, perform when executing features of WINDOWS®.

Moreover, those of skill in the art appreciate that hardware and software are in many cases interchangeable. A function performed by a software component may be replaced by a function that is performed by a hardware component. In this regard, such functions may be tested by testing software 120 regardless of whether they are performed by hardware 123 or software 121-122. Indeed, as hardware and software design becomes more sophisticated, the design of hardware and software is frequently subject to some collaboration between hardware and software manufacturers. Both manufacturers may likely perform testing along the way to ensure the stable development of their products.

Testing software may produce test results 130. Results 130 may be presented to human analysts as raw data via paper printouts or display on a monitor. Results 130 may also be further processed by testing software 120 or by some other associated software (not shown) in order to assist analysts with recognition and investigation of potential problems with the tested entity. Such processing may entail, for example, reducing the quantity of test results by filtering to determine which individual results are significant. It may further entail presentation of data to analysts in a User Interface (UI) that allows easy navigation among various results, pursuit of further information, analysis tools, and so forth.

Results from previous test runs may be used as a baseline against which the success of recent or "daily" tests are measured. Thus, in one embodiment, test results 130 may be compared to baseline results (not shown) to determine if software, e.g., 121 performed faster or slower than in a previous test run. If there was a significant change in speed, a regression may be automatically flagged and presented to analysts via a testing UI (not shown) for further investigation.

In a setting such as FIG. 1, processor 110 may handle demands by various hardware or software components in addition to the demands of software 121, 122 or hardware 123 under test. For example, operating system 100 may comprise any number of components that require processor 110 execution. Software 140 and hardware 150 may also demand processor 110 resources. Testing software 120 itself also runs simultaneously with the software 121, 122 or hardware 123 under test. Any of the above components may therefore interrupt processor 110 when it is executing demands presented by the particular software 121 or 122 or hardware 123 under test. Processor activity that is not directed to execution of demands presented by software 121 or 122 or hardware 123 under test is considered "noise." Noise can hinder the identification of regressions in software or hardware testing because the entity being tested, e.g. 121, may execute more slowly than in a baseline test run due to noise presented by, e.g., 140 and not because 121 actually performed more slowly than previously.

When this noise occurs during a test, it masquerades as a real regression, incurring a loss of human time to investigate the regression and eroding confidence in the numbers reported. The noise comes from the computer executing tasks that are not directly related to the task of interest while measurements are being taken.

One advantage of the invention is the ability to account for noise in performance timing information from a computer. This is especially advantageous in dealing with performance tests that are automated, since there may be many tests that run on many machines every day. When testing is done on this scale, reducing the impact of false regression identifications due to noise is dramatic.

Figure 2:
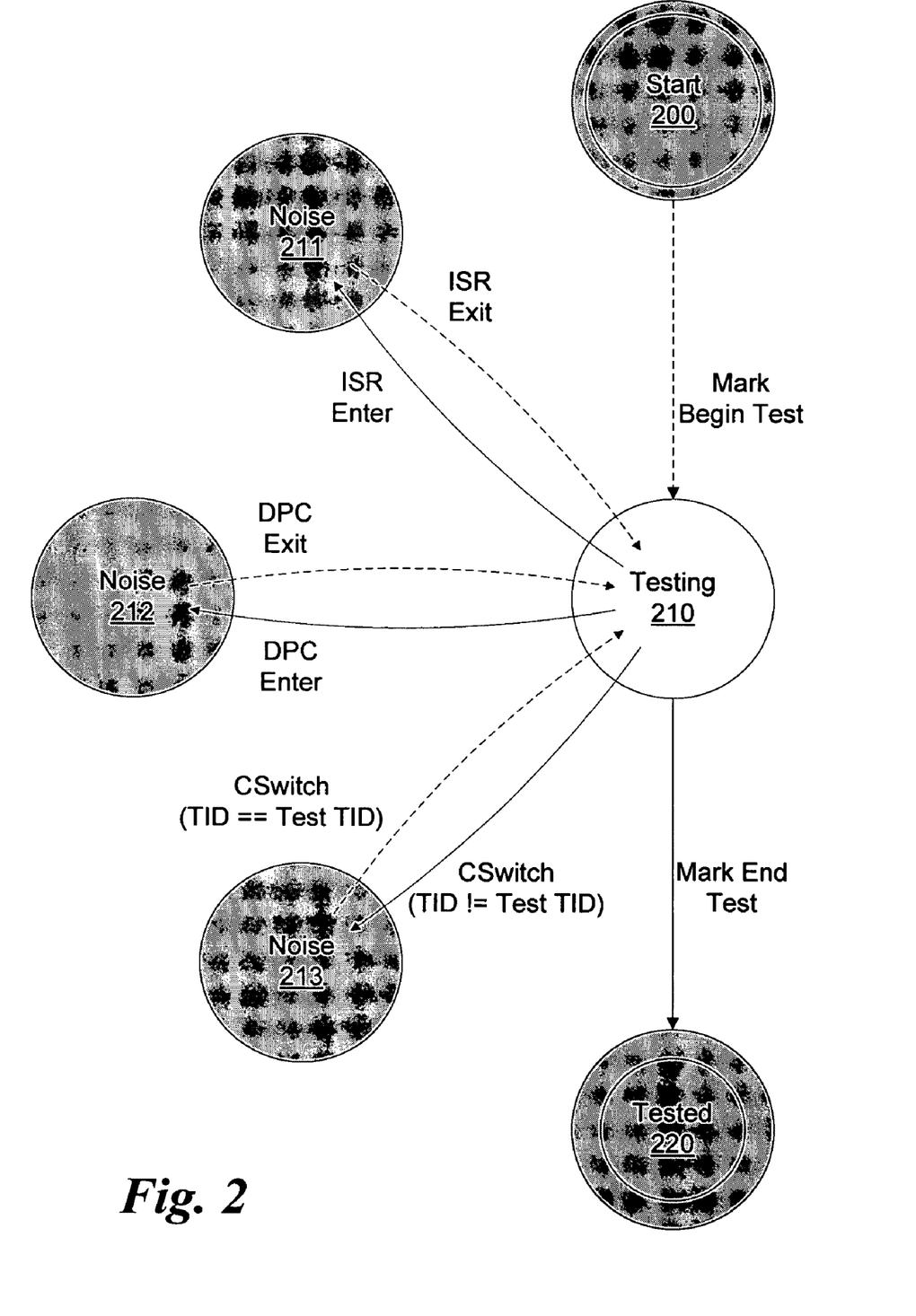
FIG. 2 illustrates a state diagram in which a processor first starts testing 200, then during testing 210 handles a plurality of "noise" activities 211, 212, 213, and finally finishes testing 220.

FIG. 2 illustrates a state diagram in which a processor first starts testing 200, then during testing 210 handles a plurality of "noise" activities 211, 212, 213, and finally finishes testing 220. This state transition chart demonstrates several aspects of the invention which are discussed in greater detail below and in discussion corresponding to remaining FIGS. 3-6.

Information such as the events illustrated in FIG. 2, which is information about processor activity, can be gathered during a test. While the invention is not limited to the use of any particular product or technique for gathering such information, embodiments may leverage an event tracing architecture such as the "Event Tracing for WINDOWS®" technology built into, for example, the WINDOWS XP® operating system. In such embodiments, testing software may initialize event tracing so the operating system logs processor events when they occur. This produces a record of what the computer was doing while the test is running. In this regard, in some embodiments monitoring the type of noise we do utilizes operating system support. Watching when CPU context switches occur, and other events, requires executing code to log the event when the context switch occurs. In general, context switching is a function of the operating system. So, one way to do this is to incorporate an ETW type technology into an operating system. Depending on the operating system design, it is also possible to add on system drivers to replicate event information.

Figure 4:
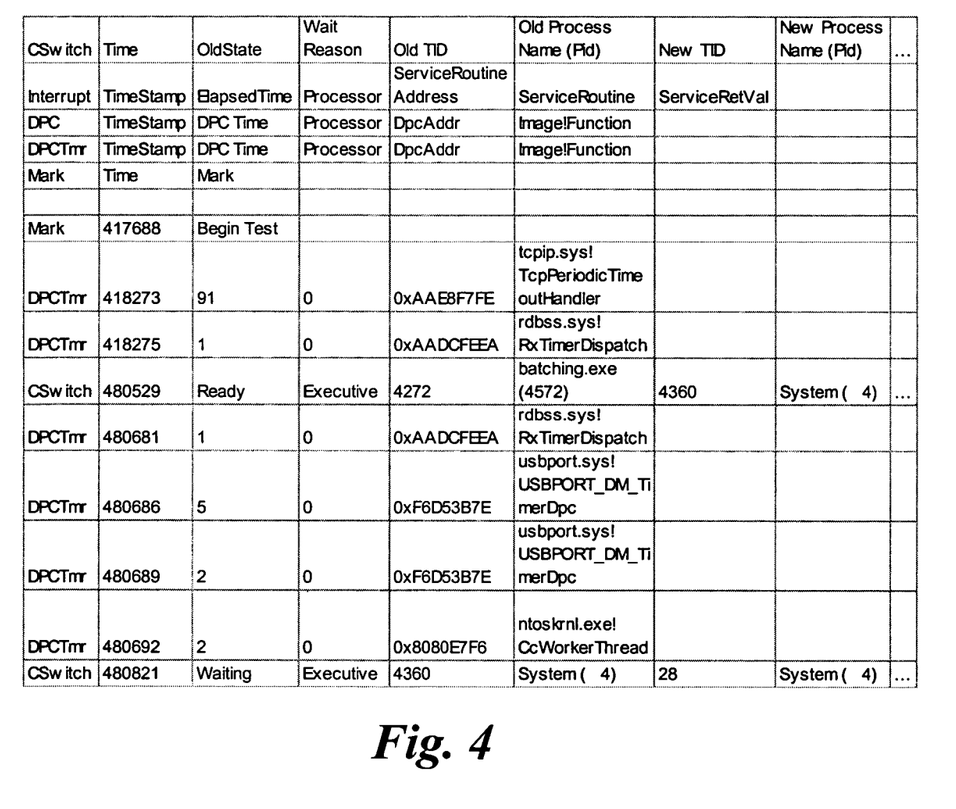
FIG. 4 provides an exemplary test log of processor activity during a test. Using such a log, time spent on a test versus noise activity may be calculated.

In the broadest definition, an event is anything significant enough to be logged to a file, whenever it happens. When the event is logged, the most basic information to log is the time that the event happened. Additional information associated with each event may also be logged when the event occurs, but the amount and type of additional information will depend on the type of event. Examples of the type of information associated With events is available in FIG. 4. FIG. 4 also shows some specific types of events and the information associated with them that may be utilized in practicing the invention.

Figure 3:
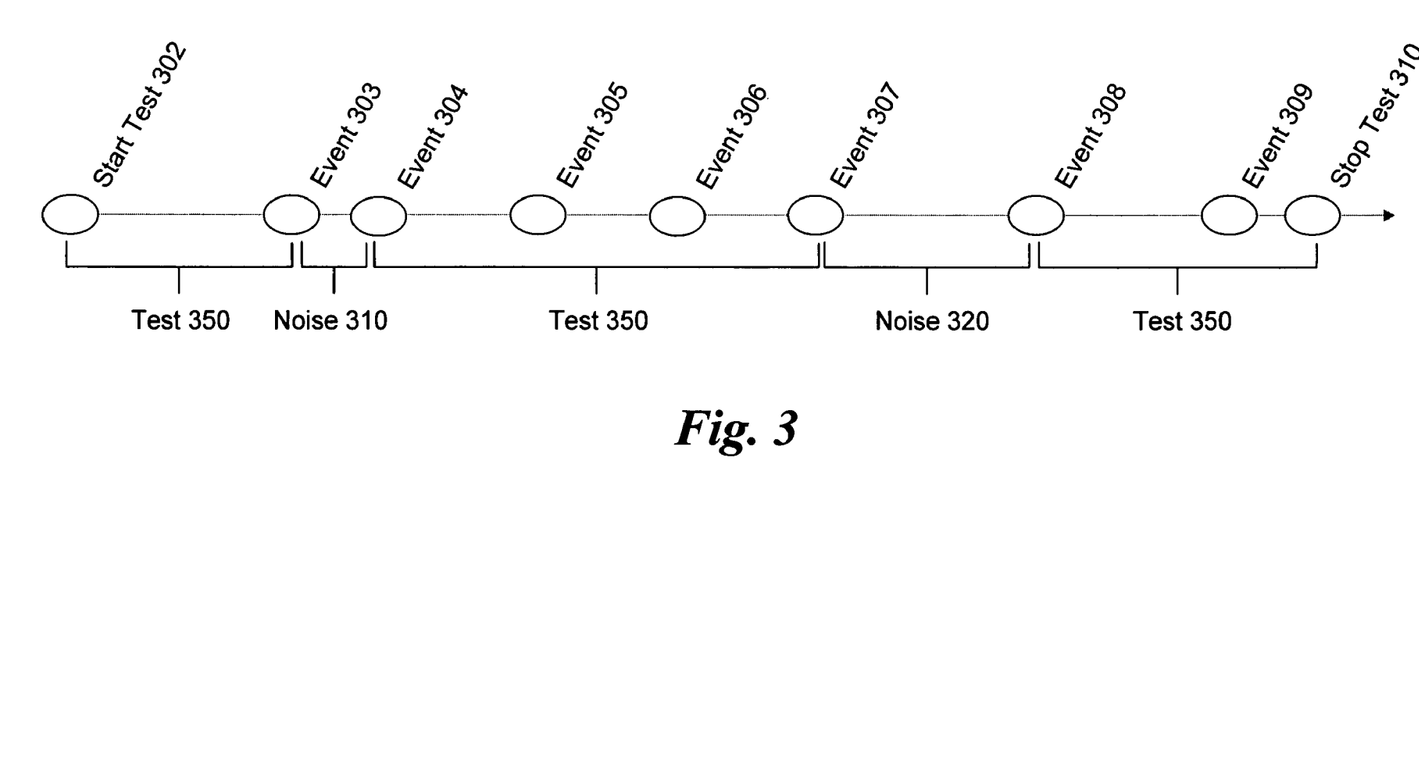
FIG. 3 illustrates a timeline showing an exemplary sequence of processor activity during a test. A test may start 302, proceed for some time, then perhaps be interrupted by noise activities such as 310 and 320, and finally stop 307.

FIG. 3 illustrates a timeline showing an exemplary sequence of processor activity during a test 350. Test 350 may start at "start test" 302, proceed for some time, and finally stop at "stop test" 310. During the time test 350 was executing, a number of events 303-309 may be logged. Some events, such as event 305, event 306, and event 309, may not indicate that the test activity 305 was interrupted. Such events may instead indicate, for example, some normal aspect of the operation of software or hardware under test.

Other events, however, such as event 303, event 304, event 307, and event 308, may indicate noise, e.g. 310 and 320. These events may indicate either interruption of a test 350 by noise—for example, events 303 and 307, or, conversely, a resumption of test 350 from a noise activity—for example, events 304 and 308. Events 303, 304, 307, and 308 thus indicate the boundaries of the noise 310 and 320 that occurred during test 350. If the times for events 303, 304, 307, and 308 are recorded, then the actual time a processor spent on test 350 can be calculated by subtracting noise 310 and 320 from a gross test time measured by the time between 302 and 310. It is also possible for events to occur during noise. So, there could be a hypothetical event 303.5, that doesn't cause transitions out of noise. This is conceptually similar to the occurrence of events 305 and 306, which occur during testing but don't determine noise boundaries.

Determination of which events 303-309 indicate noise boundaries and which events are instead part of test 350 activity can be made on a case by case basis depending on factors such as what events are logged by a particular event tracing mechanism, and which events are considered part of a test 350 and therefore not noise. In some embodiments, a set of events that typically indicate noise boundaries can be identified. These identified events can then be recognized by logic that automatically analyzes an event trace log and performs operations for noise accommodation and regression prioritizing when presenting data to a test analyzer as described herein.

FIG. 4 provides an exemplary trace log of information about processor activity. The exemplary log provided here is an output of the "Event Tracing for WINDOWS®" feature. This feature logs many types of events to a file, and each event is logged with a timestamp to indicate when it occurred. FIG. 4 is related to FIG. 3 and FIG. 2. In FIG. 4, the line that starts with "DPCTmr 418273" could refer, for example, to Events 303 and 304 in FIG. 3. DPCTmr is a type of event which doesn't log both 303 & 304. Instead, it logs 304, and an elapsed time, so 303 can be derived, at least in the ETW infrastructure embodiment set forth herein.

In FIG. 4, the first 5 rows provide a mini-description of each event type and enable the later information (after the first 5 rows) to be decoded. The first column indicates the type of event. The rest of the columns indicate the additional data associated with such an event type and a short description.

Row 6 is blank. Rows 7-15 (the remaining rows) provide an example of a log. Each row denotes an event. The data in the columns cannot be deciphered without looking at the first column, which contains the event type. Thus, the FIG. 4 example provides only the first 9 interesting events that occurred during an example test run. This is sufficient, however, for understanding the log. The first event, a Mark, is used by the test to denote a transition such as that of 200 to 210 in FIG. 2. Such an event also is used to communicate which thread id belongs to the test. To be consistent with the log of FIG. 4, the TID 4272 would be logged by the test as the "test thread" for use when determining transitions to/from 213 in FIG. 2. FIG. 4 shows a test start, then two DPCTmr "noise" events which interrupt the CPU from test activity, and then a context switch to "System", which continues to use the CPU for the remainder of the example. A complete test run would also include a transition back to the test thread (not illustrated) and a Mark for the end of the test (not illustrated).

In embodiments that utilize this technology, events which are indicative of noise are, for example, the CSwitch, DPC, and ISR events. A brief explanation of why these events are considered noise follows below to demonstrate criteria which may be used as determination of which events do, and do not, indicate noise.

While the primary work accomplished in a computer is in a processor, or Central Processing Unit (CPU) the CPU in modern computer systems may be a virtualized resource, and can be shared between many applications. The CPU may thus be interrupted in its current task, saving the current state, and then switched to another task which was waiting to use the CPU. This is known as preemptive multitasking.

In order to support preemptive multitasking, the CPU must be interruptible. Other parts of the computer system can interrupt the CPU in order to run a particular routine for a short while. DPCs are roughly equivalent to interrupts. Interrupts are ranked, and interrupts of a higher rank can preempt those of lower ranks. DPCs are essentially interrupts that run at the lowest rank. Doing this means that the DPCs run instead of what the CPU would typically be doing; but the CPU can still be preempted by interrupts of higher priority. When the CPU is not executing the task that is desired to be tested, the CPU may be considered to be executing noise.

While events indicative of preemptive multitasking are one set of events indicating noise, other noise events may be identified and treated similarly to the CSwitch, DPC, and ISR events as described herein.

After testing software conducts one or more tests and thereby produces one or more logs such as the exemplary log of FIG. 4, additional processing can be conducted using the data in the log. With an algorithm to detect when the computer was executing what was intended (the test) vs. what was not intended (the noise), the noise can be identified and accommodated for when presenting test results to an analyst. For example, in one embodiment, some test results can be discarded and the test rerun if the noise was larger than a predetermined percentage threshold. When only those results that are actually noisy are discarded, only a small amount of time is lost to re-running the tests.

Another way to accommodate for noise is by subtracting noise from the total test time when identifying regressions. For example, if a baseline test time was 10 seconds, and a daily test took 15 seconds, that may be a significant regression. However, if 6 seconds of test time from the daily test were in fact due to noise, the daily test time can be considered to take only (15-6)=9 seconds, therefore no analysis of a regression may be necessary. In another case, total test time from the daily test may be, for example, 10 seconds, with 6 seconds of noise once again. Here, the test time may be considered to be 4 seconds, which is a significant gain over a baseline time of 10 seconds. Such a significant difference in time may also be referred to as a regression, and may warrant investigation. An aspect of the invention thus aids in identification of regressions as well as elimination of incorrectly identified regressions.

As an example, when something like a system service wakes up and does work in a computer system for a short time, thereby using processor time during a test, the resources used by the service may be logged in a table such as FIG. 4. The noise from the service may be subtracted from the test time, or the corresponding test results can be discarded, and the test rerun.

Figure 5:
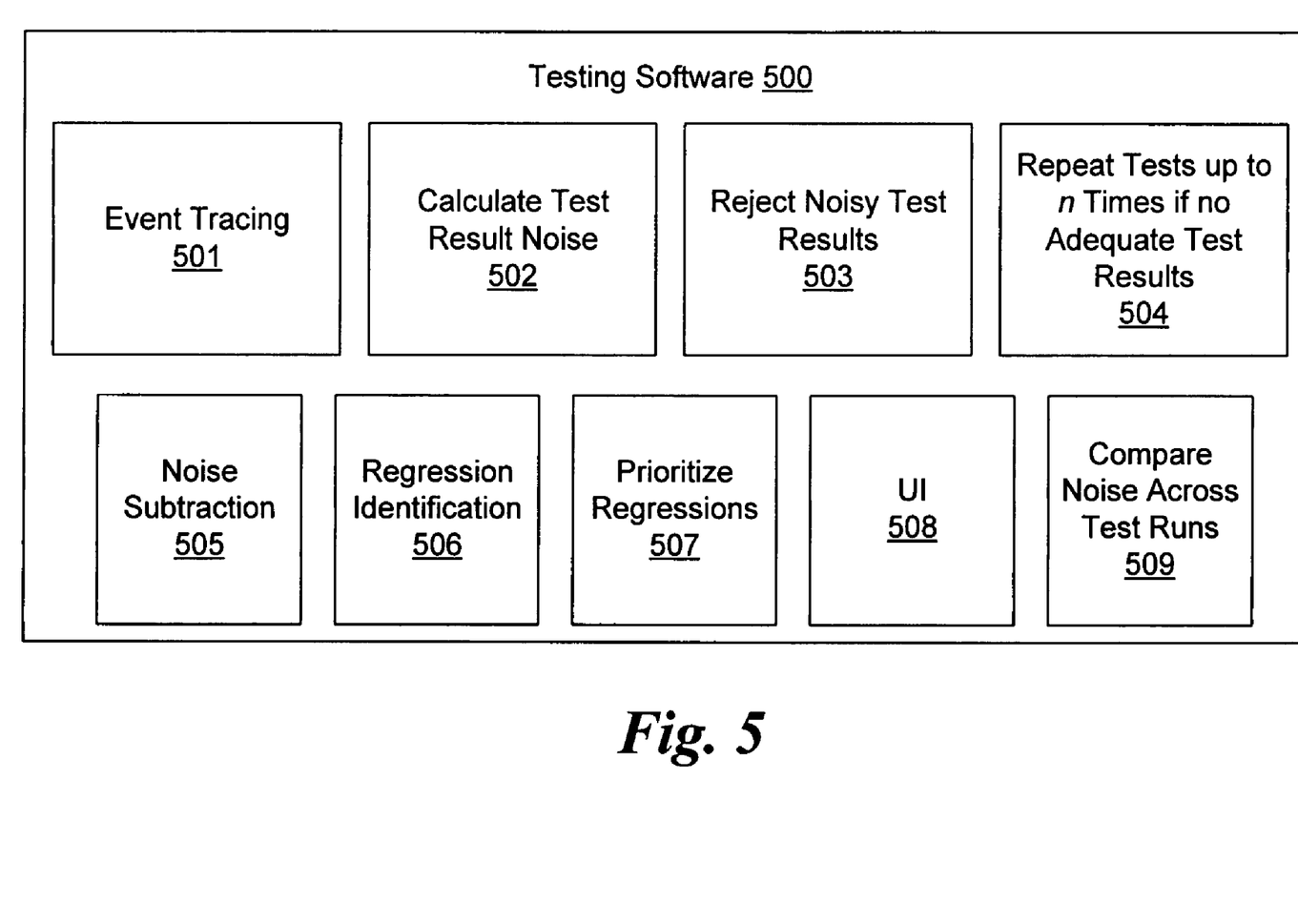
FIG. 5 illustrates a collection of testing components which are useful in accounting for noise. Event tracing 501 records processor events, which are useful in determining an amount of processor activity directed to the test versus noise. Test result noise may be calculated by 502. The noise may be accounted for in various ways, as discussed herein.

FIG. 5 illustrates testing software 500 with components for implementing embodiments of the invention. Testing software 500 may comprise any number of components not illustrated in FIG. 5, as will be recognized by those of skill in the art. Moreover, some of the components in testing software 500 may exist in software outside of the exclusive control of testing software 500. For example, the Event Tracing for WINDOWS® feature that is available in some MICROSOFT® operating systems may be more closely associated with operating system software than testing software 500. In such embodiments, testing software is leveraging, rather than completely controlling, one or more of the components illustrated in FIG. 5.

The components 501, 502, 503, 504, and 505 may be implemented as computer-executable instructions, such as program modules, executed by one or more computers or other devices. Generally, program modules include routines, programs, objects, components, data structures, etc. that perform particular tasks or implement particular abstract data types. Typically the functionality of the components may be combined or distributed as desired in various embodiments. Thus, the components of FIG. 5 describe various aspects of functionality that may be logically separated or tightly integrated, as desired for design of particular embodiments of the invention.

Component 501 can provide event tracing during a test. This component 501 thus serves to gather information about processor activity during execution of software and/or hardware that is being tested by testing software 500.

Component 502 can calculate test result noise. For example, when calculating noise from a log such as the log of FIG. 4, component 502 can examine log entries and time stamps, and determine if any events indicate noise during a test. If so, the corresponding noise time can be calculated for the test.

Component 503 can reject noisy test results. For example, noise time calculated for a test by 502 may be compared to a threshold noise time, and if the test noise time is longer than the threshold, the result may be discarded. Another approach is to use a threshold noise ratio, such as a threshold percentage of noise. For example, if noise time amounts to over $\frac{1}{10}$ (10%) of the gross test time, then test results may be discarded. This is exemplary only and actual thresholds should be determined based on requirements of specific testing systems.

A reason to include a component such as 503 is that noise may impact operation of software under test in ways beyond simply the time required to process noise. For example, resources needed by software or hardware under test may be evicted from memory to process noise, and those resources may have to be retrieved when testing resumes. This could negatively impact test time even when noise is subtracted.

Component 504 can repeat tests when results are discarded due to excessive noise. This is a way to automatically ensure that quality test results are available. Some embodiments may place a limit on the number of times a test is rerun. For example, after 8 test reruns, it may be preferable to use test results from the least noisy test rather than continue repeating a test. Again, the number 8 is not intended to limit the invention, and the number of reruns can be configured based on individual testing requirements. This component 504 may be configured to preempt discard of test results in situations where no samples are available that satisfy the requirements of component 503.

Component 505 may calculate actual test time, for example by subtracting noise time from gross test time. Component 506 may then identify regressions for human analysis by comparing actual test time with an actual test time from one or more previous tests—the baseline. Regression identification may comprise any techniques to identify significant regressions. For example, an amount of difference between baseline and daily test results may be predetermined, and only regressions that are above this chosen value may be considered worthy of investigation. Such a technique allows for natural variability that occurs when trying to measure the speed of hardware or software.

Statistical techniques may also be used by 506 to help mitigate natural variability. Relying on statistical methods typically requires tests to be run a number of times sufficient to gather enough data from which to accurately calculate statistics. Thus, for example, statistics might be used to determine what is a statistically significant regression, based on data from previous tests. Statistical techniques can be wielded with great precision in the context of the invention because the variation due to noise can be removed, thereby decreasing the amount of variation in the statistical analysis.

Component 507 may prioritize regressions for investigation. The realities of testing are that occasionally so many regressions may be identified that all of them cannot be properly investigated. Thus, a component such as 507 can be useful in ranking regressions. A larger regression may be a higher priority for investigation than a smaller regression. Also, regressions indicating slower execution of software may be higher priority than regressions indicating faster execution of software.

Component 508 may present test result data in a UI for analysis. When used in conjunction with the other components of FIG. 5, the UI can present a prioritized list of noise-free regressions. By eliminating regressions due to noise, the list of regressions to investigate is expected to be shorter and more accurate, thereby giving analysts greater confidence in the results and making more efficient use of analysis time.

Operating system producers, such as MICROSOFT®, are concerned with how noisy the operating system is, out of the box. A noisy operating system impairs time sensitive applications, such as games, video & audio playback, etc. Thus, a component 509 may further provide a function of accumulating all noise incidents, then regression testing the amount of noise from one test run to the next. If the amount of noise on the system becomes more frequent, or of longer duration, than the noisiness of the operating environment can be said to "regress". Such a regression is undesirable and valuable to identify so it can be addressed.

Figure 6:
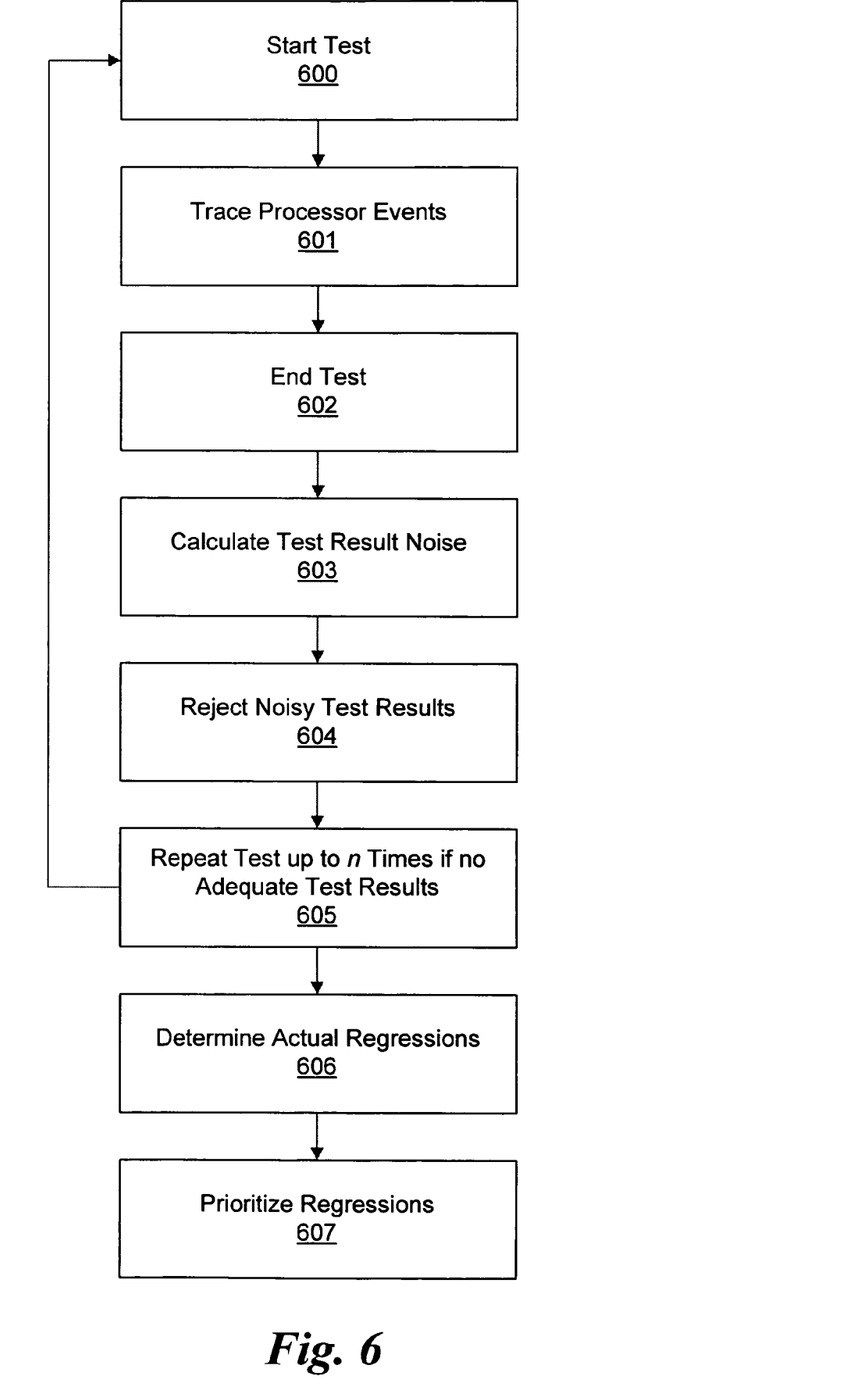
FIG. 6 illustrates a process in which a test is run in steps 600-602. Test result quality is assured in steps 603-605. Actual regressions may then be determined 606 and prioritized 607 for analysis.

FIG. 6 presents an exemplary process that can implement many of the features described with respect to FIG. 5. The process illustrated in FIG. 6 provides that a test may be stared 600 and processor activity can be gathered, or "traced" and recorded 601 until ending the test 602. Events can be recorded in a trace log. The trace log may be processed 603, by looking through the log for events that correspond to noise, and calculating the amount of noise that occurred. Noisy test results may be rejected 604, and if so, the test may be repeated as necessary to obtain quality, low noise samples 605. Repetition of a test entail restarting the test at step 600.

Once adequate test data is obtained, the test data may be further processed 606 by removing any noise from the results and/or comparing results to previous test results to identify regressions. As described above, a "regression" may be considered to be a significant regression only if it meets some predefined criteria, such as presenting a large enough divergence (as set by individual test designers) from baseline test results. Finally, identified regressions may be prioritized 607 and presented to a user via a UI.

While the above process is described with respect to a single processor system, there may be techniques available to extend it to multiprocessor systems. Extension of the algorithm to operate in multiprocessor systems is advantageous and is within the scope of the invention if the techniques set forth herein are applied any of the processors in the system.

Finally, it should be noted that the invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

What is claimed:

1. A method for testing software performance, comprising: determining a test result, comprising:
    causing software to execute on a processor;
    gathering information about processor activity when executing said software, wherein said information comprises a plurality of processor events;
    identifying in said information at least one event that indicates said processor performed noise activity that was not for the purpose of executing said software; and
    determining at least in part from said at least one event an amount of noise activity that occurred when executing said software; and
rejecting the test result if said amount of noise activity is above a predetermined threshold level, wherein said predetermined threshold level is determined in proportion to a total amount of processor activity that occurred when executing said software.

2. The method of claim 1, further comprising retesting said software when said test result is rejected.

3. The method of claim 1, wherein said test result is rejected unless said software is tested a plurality of times without producing results with said amount of noise activity below said predetermined threshold level.

4. The method of claim 1, further comprising subtracting said amount of noise activity from a total amount of processor activity that occurred when executing said software.

5. A method for testing software performance, comprising: determining a test result, comprising:
    causing software to execute on a processor;
    gathering information about processor activity when executing said software, wherein said information comprises a plurality of processor events;
    identifying in said information at least one event that indicates said processor performed noise activity that was not for the purpose of executing said software; and
    determining at least in part from said at least one event an amount of noise activity that occurred when executing said software; and
comparing said test result to a previous test result.

6. The method of claim 5, further comprising identifying a regression if there is a difference between said test result and said previous test result.

7. The method of claim 6, wherein said difference is a predetermined significant difference.

8. The method of claim 6, further comprising prioritizing said regression among a plurality of regressions.

9. The method of claim 8, further comprising presenting a prioritized list of regressions in a User Interface (UI).

10. The method of claim 1, wherein said gathering information about processor activity is conducted using the Event Tracing for WINDOWS® feature.

11. A method for presenting test results to a test analyst, comprising:
    identifying in said test results at least one processor event that indicates a processor performed noise activity that was not for the purpose of executing tested software;
    determining at least in part using said at least one processor event an amount of gross test time during which said processor was not executing said tested software;
    subtracting said amount of gross test time from a gross test time to obtain a value;
    comparing said value to a previous value;
    presenting said value as a regression if said value differs from the previous value.

12. The method of claim 11, farther comprising discarding at least one test result when the amount of gross test time during which said processor was not executing said tested software exceeds a predetermined threshold level.

13. The method of claim 11, farther comprising retesting said tested software.

14. The method of claim 11, farther comprising gathering the at least one processor event using the Event Tracing for WINDOWS® feature.

15. The method of claim 11, wherein presenting said value as a regression comprises presenting said value in a prioritized list of regressions in a User Interface (UI).

* * * * *

UNITED STATES PATENT AND TRADEMARK OFFICE
CERTIFICATE OF CORRECTION

| | | |
|---|---|---|
| PATENT NO. | : 7,490,269 B2 | Page 1 of 1 |
| APPLICATION NO. | : 11/210995 | |
| DATED | : February 10, 2009 | |
| INVENTOR(S) | : Brian T. Klamik | |

It is certified that error appears in the above-identified patent and that said Letters Patent is hereby corrected as shown below:

In column 10, line 40, in Claim 12, delete "farther" and insert -- further --, therefor.

In column 10, line 44, in Claim 13, delete "farther" and insert -- further --, therefor.

In column 10, line 46, in Claim 14, delete "farther" and insert -- further --, therefor.

Signed and Sealed this
Third Day of May, 2011

David J. Kappos
*Director of the United States Patent and Trademark Office*